United States Patent
Subramanian et al.

(10) Patent No.: US 12,152,503 B2
(45) Date of Patent: Nov. 26, 2024

(54) HIGH TEMPERATURE CAPABLE ADDITIVELY MANUFACTURED TURBINE COMPONENT DESIGN

(71) Applicant: Siemens Energy Global GmbH & Co. KG, Munich (DE)

(72) Inventors: Ramesh Subramanian, Oviedo, FL (US); Michael Walker, York, SC (US); Daniel Cassar, Charlotte, NC (US); Lieke Wang, Oviedo, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 268 days.

(21) Appl. No.: 17/754,360

(22) PCT Filed: May 29, 2020

(86) PCT No.: PCT/US2020/070091
§ 371 (c)(1),
(2) Date: Mar. 30, 2022

(87) PCT Pub. No.: WO2021/067978
PCT Pub. Date: Apr. 8, 2021

(65) Prior Publication Data
US 2022/0333494 A1  Oct. 20, 2022

Related U.S. Application Data

(60) Provisional application No. 62/911,687, filed on Oct. 7, 2019, provisional application No. 62/910,757, filed on Oct. 4, 2019.

(51) Int. Cl.
*F01D 5/28* (2006.01)
*B33Y 80/00* (2015.01)
(Continued)

(52) U.S. Cl.
CPC .............. *F01D 5/288* (2013.01); *B33Y 80/00* (2014.12); *C23C 4/11* (2016.01); *C23C 4/18* (2013.01);
(Continued)

(58) Field of Classification Search
CPC . F01D 5/288; F01D 5/18; B33Y 80/00; F05D 2240/35; F05D 2300/603; F05D 2300/611
See application file for complete search history.

(56) References Cited

U.S. PATENT DOCUMENTS

2016/0237828 A1*  8/2016  Burd .................. F01D 5/18
2017/0350256 A1   12/2017  Dutta et al.
2017/0350260 A1*  12/2017  Dutta .................. F01D 25/12

FOREIGN PATENT DOCUMENTS

KR    2019037492 A  *  4/2019  ............ F01D 25/12
KR    20190037492 A     4/2019
(Continued)

OTHER PUBLICATIONS

[NPL-1] Kang Han Saem (KR 10-2019-0037492 A); Apr. 8, 2019 (EPO machine translation to English). (Year: 2019).*
(Continued)

*Primary Examiner* — David Sample
*Assistant Examiner* — Donald M Flores, Jr.
(74) *Attorney, Agent, or Firm* — Wolter Van Dyke Davis, PLLC

(57) ABSTRACT

A hybrid three-layer system is presented. The hybrid three-layer system includes a two-layer composite system and an additively manufactured third layer comprising a lattice structure. The composite layer system includes a metallic substrate, a structured surface, and a thermal protection system. The structured surface may be additively manufactured onto the metallic substrate and includes structured surface features formed to project above the metallic sub-
(Continued)

strate. Each of the structured surface features are separated from adjacent structured surface features by grooves. The thermal protection coating may be thermally sprayed onto the structured surface and is bonded to each of the structured surface features. The lattice structure is in contact with a surface of the metallic substrate of the composite layer system.

13 Claims, 15 Drawing Sheets

(51) Int. Cl.
*C23C 4/11* (2016.01)
*C23C 4/18* (2006.01)
*F01D 5/18* (2006.01)
*F01D 9/02* (2006.01)

(52) U.S. Cl.
CPC .............. *F01D 5/18* (2013.01); *F01D 5/282* (2013.01); *F01D 9/02* (2013.01); *F05D 2220/32* (2013.01); *F05D 2230/311* (2013.01); *F05D 2240/121* (2013.01); *F05D 2240/122* (2013.01); *F05D 2240/35* (2013.01); *F05D 2260/231* (2013.01); *F05D 2300/603* (2013.01); *F05D 2300/611* (2013.01)

(56) References Cited

FOREIGN PATENT DOCUMENTS

| WO | WO-2015130519 A1 * | 9/2015 | .............. B22C 7/02 |
| WO | WO-2015130528 A1 * | 9/2015 | .............. B22C 7/02 |
| WO | WO-2019032449 A1 * | 2/2019 | .............. B22F 10/20 |

OTHER PUBLICATIONS

PCT International Search Report and Written Opinion of International Searching Authority mailed Mar. 10, 2021 corresponding to PCT International Application No. PCT/US2020/070091 filed May 29, 2020.

* cited by examiner

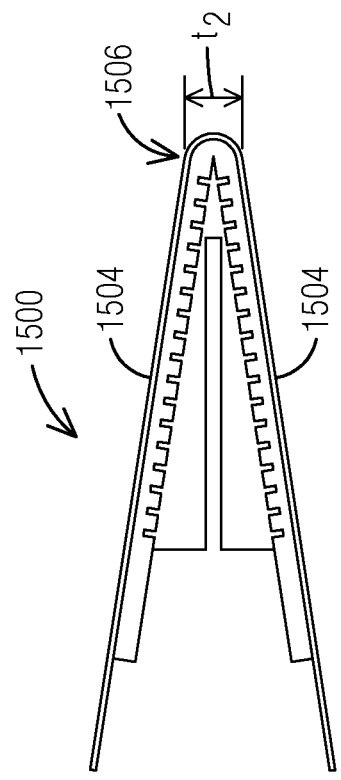
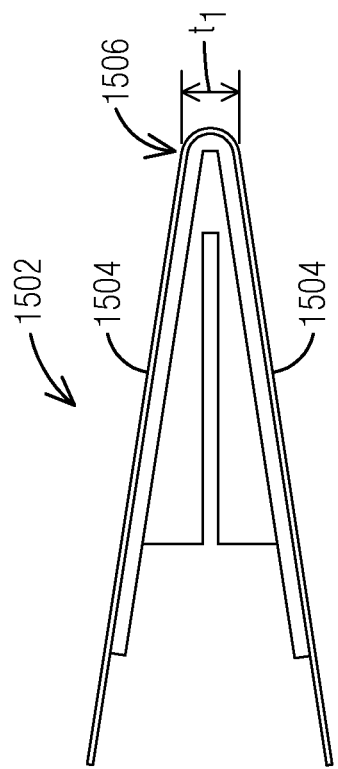
FIG. 15

HIGH TEMPERATURE CAPABLE ADDITIVELY MANUFACTURED TURBINE COMPONENT DESIGN

BACKGROUND

Internal components of gas turbine engines, especially those in the hot combustion gas path, are exposed to temperatures of approximately 900 degrees Celsius or hotter. In order to make engines more efficient, the trend is to produce engines operating under higher firing temperatures. The engine internal components within the combustion path are often constructed of high temperature superalloys. These superalloy components often include cooling passages terminating on the component outer surface for passage of coolant fluid to cool the surfaces exposed to the hot combustion gases.

BRIEF SUMMARY

In one embodiment, a hybrid three-layer system is presented. The hybrid three-layer system includes a two-layer composite system and an additively manufactured third layer comprising a lattice structure. The composite layer system includes a metallic substrate, a structured surface, and a thermal protection system. The structured surface may be additively manufactured onto the metallic substrate and includes structured surface features formed to project above the metallic substrate. Each of the structured surface features are separated from adjacent structured surface features by grooves. The thermal protection coating may be thermally sprayed onto the structured surface and is bonded to each of the structured surface features. The lattice structure is in contact with a surface of the metallic substrate of the composite layer system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 15 illustrates a cross sectional view of a conventional edge portion of a gas turbine component as compared with an edge portion including a composite layer system.

DETAILED DESCRIPTION

Figure 1:
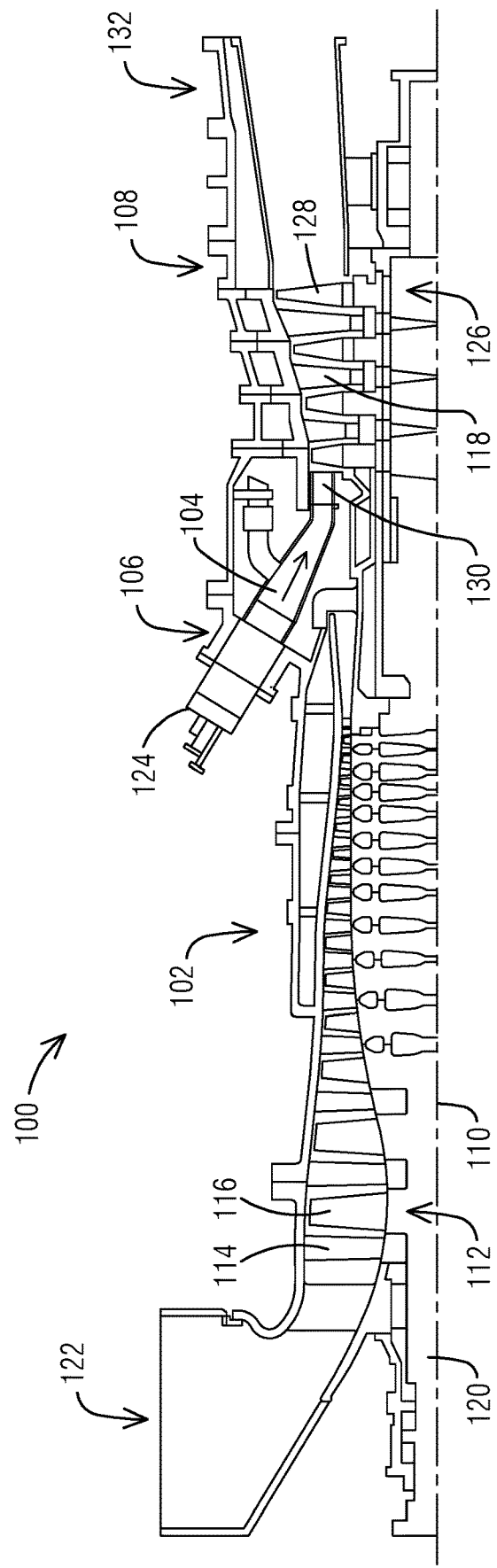
FIG. 1 illustrates a longitudinal view of a gas turbine engine.

FIG. 1 illustrates an example of a gas turbine engine 100 including a compressor section 102, a combustor section 106, and a turbine section 108 arranged along a longitudinal axis 110. The compressor section 102 includes a plurality of compressor stages 112 with each compressor stage 112 including a set of rotating blades 116 and a set of stationary vanes 114 or adjustable guide vanes. A rotor 120 supports the rotating blades 116 for rotation about the longitudinal axis 110 during operation. In some constructions, a single one-piece rotor 120 extends the length of the gas turbine engine 100 and is supported for rotation by a bearing at either end. In other constructions, the rotor 120 is assembled from several separate spools that are attached to one another or may include multiple disk sections that are attached via a bolt or plurality of bolts.

The compressor section 102 is in fluid communication with an inlet section 122 to allow the gas turbine engine 100 to draw atmospheric air into the compressor section 102. During operation of the gas turbine engine 100, the compressor section 102 draws in atmospheric air and compresses that air for delivery to the combustor section 106. The illustrated compressor section 102 is an example of one compressor section 102 with other arrangements and designs being possible.

In the illustrated construction, the combustor section 106 includes a plurality of separate combustors that each operate to mix a flow of fuel with the compressed air from the compressor section 102 and to combust that air-fuel mixture to produce a flow of high temperature, high pressure combustion gas. The combustion gas (shown by the arrow) is conveyed by a transition 104 to a turbine section 108 of the engine, where thermal energy is converted to mechanical energy. Of course, many other arrangements of the combustor section 106 are possible.

The turbine section 108 includes a plurality of turbine stages 126 with each turbine stage 126 including a number of rotating turbine blades 128 and a number of stationary turbine vanes 118. The turbine stages 126 are arranged to receive the combustion gas from the transition 104 of combustor section 106 at a turbine inlet 130 and expand that gas to convert thermal and pressure energy into rotating or mechanical work. The turbine section 108 is connected to the compressor section 102 to drive the compressor section 102. For gas turbine engines, used for power generation or as prime movers, the turbine section 108 is also connected to a generator, pump, or other device to be driven. As with the compressor section 102, other designs and arrangements of the turbine section 108 are possible.

An exhaust section 132 is positioned downstream of the turbine section 108 and is arranged to receive the expanded flow of combustion gas from the final turbine stage 126 in the turbine section 108. The exhaust section 132 is arranged to efficiently direct the combustion gas away from the turbine section 108 to assure efficient operation of the turbine section 108. Many variations and design differences are possible in the exhaust section 132. As such, the illustrated exhaust section 132 is but one example of those variations.

Turbine engine internal components often incorporate a thermal barrier coating (TBC) of metal-ceramic material that is applied directly to the external surface of the component substrate surface or over an intermediate metallic bond coat that was previously applied to the substrate surface. The TBC provides an insulating layer over the component substrate, which reduces the substrate temperature. Combination of TBC application along with cooling channels in the component further lowers the substrate temperature.

Thermal Barrier Coatings, TBCs, are prone to cracking due to the extreme heat and exposure to combustion gases. The cracking, at times, can lead to spallation, i.e., the separation of the insulative material from the underlying substrate. Such cracking and spallation can increase the temperatures of the underlying substrate significantly resulting in premature damage and ultimately failure of the component.

Figure 2:
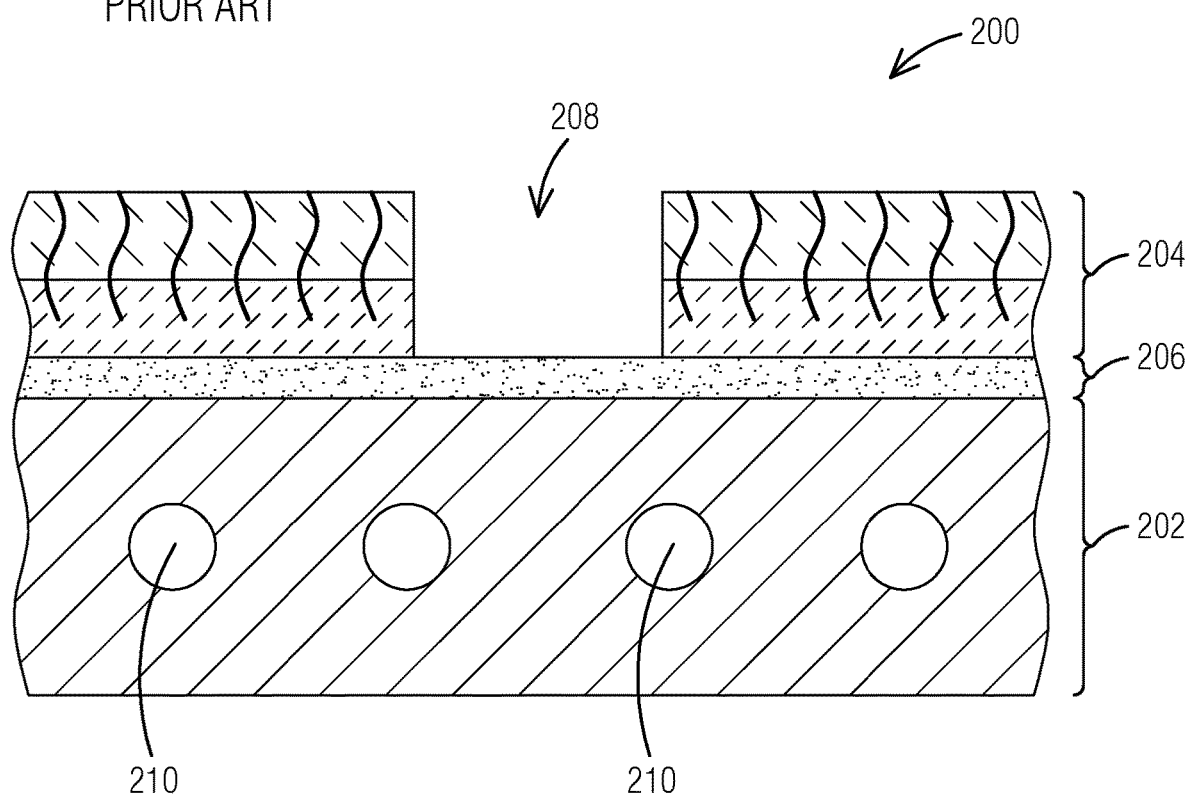
FIG. 2 illustrates a cross sectional view of a prior art metallic component having a thermal protective coating with an intact and spalled coating portion.

FIG. 2 illustrates a cross sectional view of a layered component 200 including a thermal protection coating. The layered component 200 comprises a metallic substrate 202 having a thermal barrier coating 204 applied over its surface in order to protect the underlying metallic substrate 202. In certain embodiments, the thermal barrier coating 204 is applied by thermally spraying the coating to a thickness of between 0.3 to 4 mm. A plurality of cooling channels 210 may be seen in cross section that carry a cooling air through the metallic substrate 202.

For gas turbine components, the metallic substrate 202 may include a superalloy material such as Alloy 247 (CM 247 LC®), for example. Other superalloy materials that the metallic substrate 202 may comprise include IN718™, IN738™, IN939™, Rene80™, PWA1484™ PWA1483™, AMH282™, and Stall5DE™ superalloys. These materials are especially prone to oxidation because typically these alloys include chromium which is known to oxidize. Typical materials for thermal barrier coatings may include a variety of ceramic materials such as 8YSZ (8 wt. % yttria-stabilized zirconia), 30-50 wt. % yttria stabilized zirconia, pyrochlores (such as Gd2Zr2O7), and bilayer 8YSZ/pyrochlore systems.

A bond coat 206 may be included as an intermediate layer between the metallic substrate 202 and the thermal barrier coating 204 as part of the thermal protection coating, as shown, in order to improve thermal barrier coating 204 adhesion to the metallic substrate 202. In the shown embodiment, the thermal barrier coating 204 includes a bilayer having two different ceramic materials. A top layer may include an abradable material such as 30-50 wt. % yttria stabilized zirconia or Ytterbia stabilized zirconia. The thermal barrier coating 204 generally protects the underlying metallic substrate 202 from extreme heat, such as a component in a gas turbine engine that is exposed to combustion gases. In the illustrated component, the exposure to the extreme heat has resulted in thermal barrier coating spall 208. In some instances, the spallations can increase the substrate temperature high enough to risk full wall oxidation.

Figure 3:
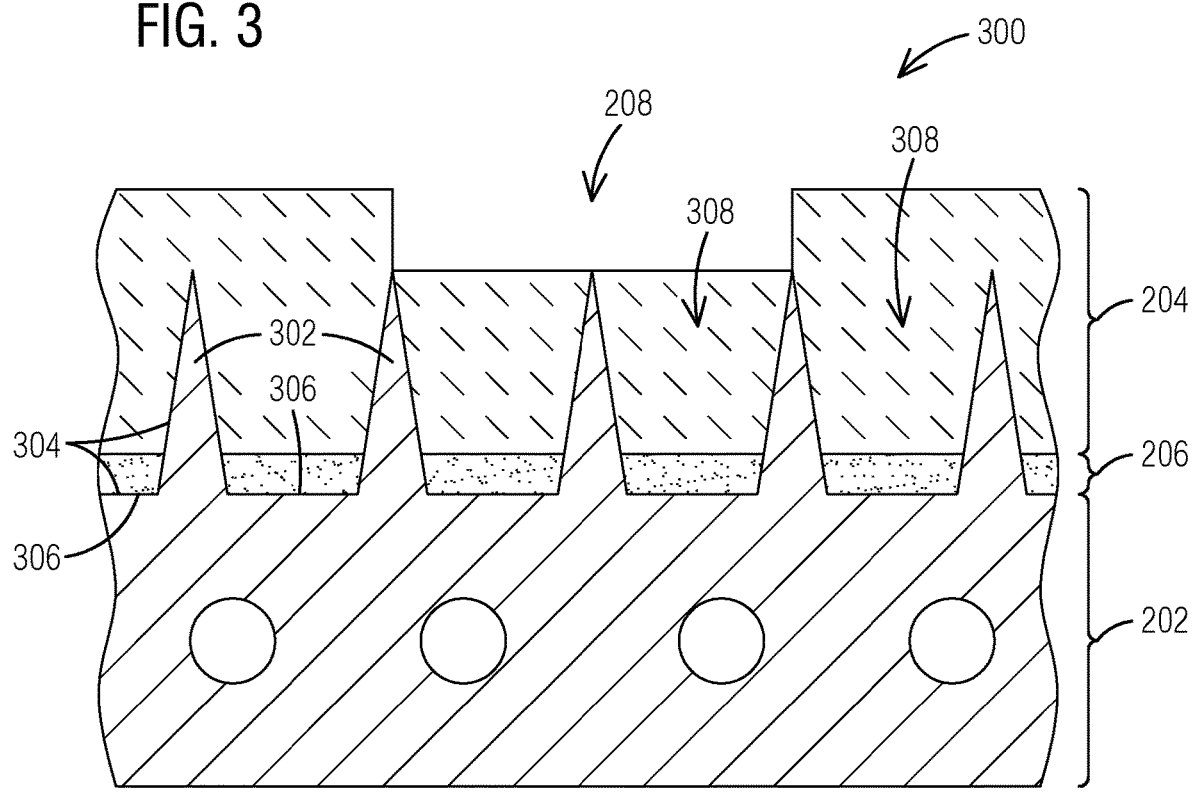
FIG. 3 illustrates a cross sectional view of a composite layer system with an intact and spalled coating portion.

FIG. 3 illustrates a composite layer system 300 having a metallic substrate 202 and a thermal protection coating. In an embodiment, the metallic substrate 202 is formed by additive manufacturing (AM). The metallic substrate 202 may include a structured surface 304 comprising structured surface features 302. These structured surface features 302 are formed during printing of the metallic substrate 202. The structured surface features 302 project from an intermediate horizontal surface 306 of the metallic substrate 202. The structured surface features 302 may be separated by grooves 308. These structured surface features 302 enhance affixation of the overlying thermal protection coating which may comprise a thermally sprayed thermal barrier coating 204 and the bond coat 206 as shown.

The structured surface features 302 may help anchor the TBC layer and/or function as a barrier or wall in order to localize thermal stress or foreign object damage induced crack propagation within the TBC that might otherwise allow excessive TBC spallation and subsequent thermal exposure damage to the turbine component's underlying metallic substrate 202. For example, as seen, in FIG. 3, the use of a structured surface 304 minimizes the amount of thermal barrier coating spall 208 and enables retention of the thermal protection coating against the underlying metallic substrate 202. This may significantly reduce the substrate temperature when compared to the substrate temperature of the surface of the metallic substrate 202 when experiencing the thermal barrier coating spall 208 as occurred in FIG. 2.

Figure 4:
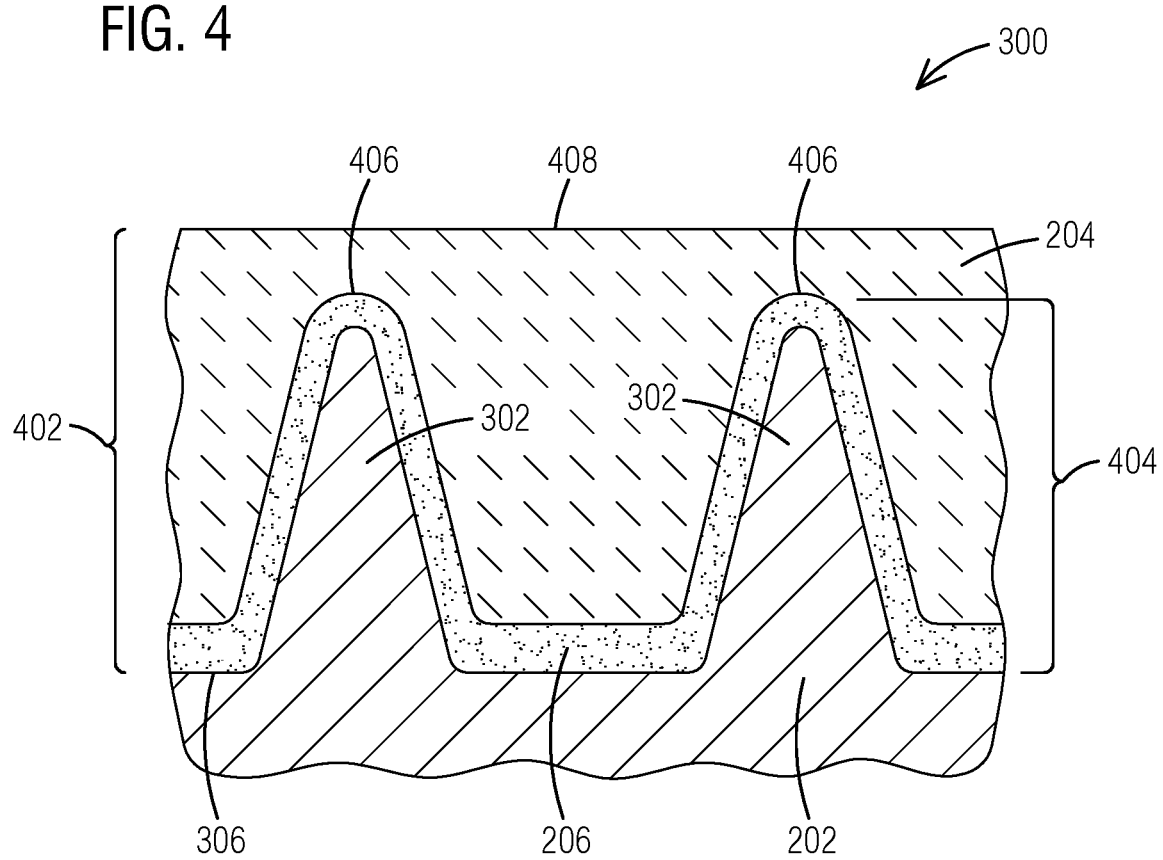
FIG. 4 illustrates a cross sectional view of a composite layer system including structural surface features having a rounded profile.
Figure 5:
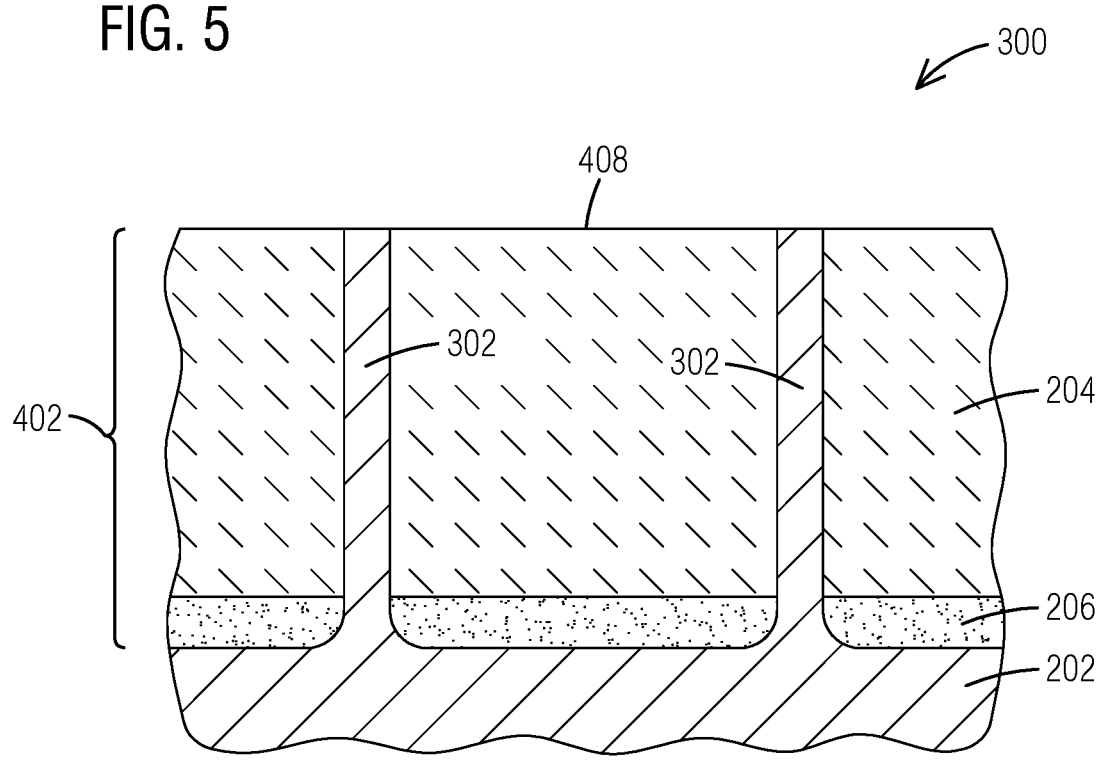
FIG. 5 illustrates a cross sectional view of a composite layer system including structural surface features having a rectangular profile.

Additive manufacturing also enables structured surface features 302 having different cross-sectional profiles. For example, FIG. 3 shows structured surface features 302 having a triangular profile. Additive manufacturing enables, for example, triangular shapes with high aspect ratios (ratio of height to width). As an example, with AM structured surface feature widths as thin as 0.1 mm and with a height of 3.5 mm, the aspect ratio may be around 35. Conventional manufacturing methods typically enable aspect ratios of less than 1. In an alternate embodiment of a composite layer system 300, FIG. 4 illustrates structured surface features 302 having a rounded tip profile so that the structured surface features 302 resemble waves. In a further alternate embodiment of a composite layer system 300, FIG. 5 illustrates structured surface features 302 having a rectangular profile so that the structured surface features 302 are rod-like. The profiles may also include more complex arrayed patterns when viewed from the top of the composite layer system 300. For example, as shown in both FIG. 6 and FIG. 7, the metallic substrate 202 includes three-dimensional structured surface features 302 that when viewed from above the composite layer system 300 includes a repeating hexagonal pattern. Referring back to FIG. 4, in an embodiment, the structured surface feature height 404 is between 1 mm and 4 mm as measured from the bottom of the groove 308 to a tip of the structured surface feature 302.

In some embodiments of the composite layer system 300, the metallic substrate 202 includes a thermally spayed overlying thermal protection coating having an overall thermal protection coating thickness 402. While the disclosure references the thermal protection coating applied as thermally sprayed, in alternate embodiments, the protection coating may be vapor deposited or solution/suspension plasma sprayed or may also be a ceramic matrix composite layer. The thermal protection coating may be sprayed so that at least the grooves 308 include the coating. In other embodiments, the thermal protection coating may include a thickness above the tips of the structured surface features 302. Thus, a ratio of the structured surface feature height 404 to the overall thermal protection coating thickness 402 may vary. In certain embodiments, the structured surface features 302 have a projection height greater than 75 percent of the overall thermal protection coating thickness 402. For example, in FIG. 4, the structured surface features 302 show a projection height, or structured surface feature height 404 of 3.0 mm to the overall thermal protection coating thickness 402 of 3.5 mm, for example, such that the projection height is about 86% of the overall thermal protection coating thickness 402. Because AM enables the fabrication of high aspect ratio features, these relatively thin features (as thin as 0.1 mm for example) may extend further into the TBC and increase the temperature capability of the thermal protection coating.

Figure 6:
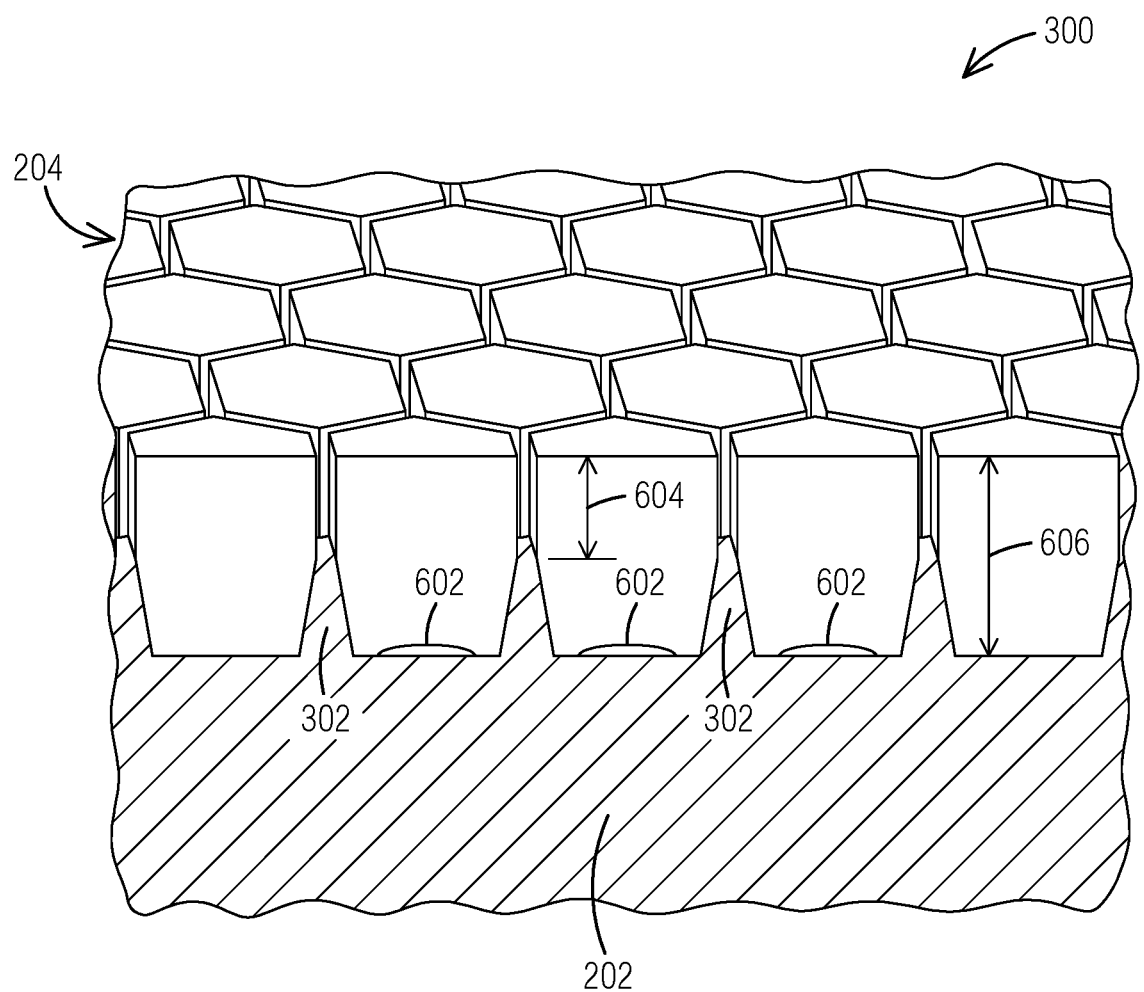
FIG. 6 illustrates a perspective view of a composite layer system having a segmented ceramic protective coating showing a height of the structured surface features.

As another example, the structured surface features 302, exemplified as rods in FIG. 5, have a feature height the same as that of the overall thermal protection coating thickness 402 such that the projection height is 100% of the overall thermal protection coating thickness 402. Thus, in metallic substrate 202, i.e., the tips of the rods in FIG. 5 project out to an outer surface 408 of the composite layer system 300. This may be accomplished by thermally spraying the thermal protection system on to the metallic substrate 202 having a thickness so that the thermal barrier coating 204 covers the structured surface features 302, then polishing the TBC surface down to the height of the structured surface features 302 so that the underlying metallic substrate 202 is visible and exposed at the outer surface 408 of the composite layer system 300. FIG. 6 illustrates a perspective view of a composite layer system 300 having a metallic substrate 202 with a segmented thermal barrier coating 204 whereby the thermal barrier coating 204 is separated into distinct isolated segments of coating. Structured surface features 302 may be seen in an essentially triangular pattern as seen in a cross-sectional view. As seen from a top view, the structured surface features 302 would form a three-dimensional repeating hexagonal arrayed pattern so that the pattern forms individual honeycomb cells. The segmented thermal barrier coating 204, as shown, may localize any TBC layer crack propagation. In the TBC of the composite layer system 300, horizontal cracking 602 is seen in a few of the TBC segments. These horizontal cracks are isolated to the TBC segment so that the cracking 602 does not propagate into other adjacent segments preventing thermal barrier coating spall 208 as seen in FIG. 2 and FIG. 3.

In an embodiment, the grid thickness, i.e., the spacing between the thermal barrier coating 204 segments, may be around 1000-6000 μmeters. A first overall height 606 of the individual segment of thermal barrier coating 204 may lie in a range of 0.5 to 3.5 mm where a second height 604 of the TBC segments above the structured surface features 302 may lie in a range of 0.25-1.5 mm The segmented TBC reduces tensile surface strain which increases the reliability of the TBC and minimizes spallation from the metallic substrate.

Figure 7:
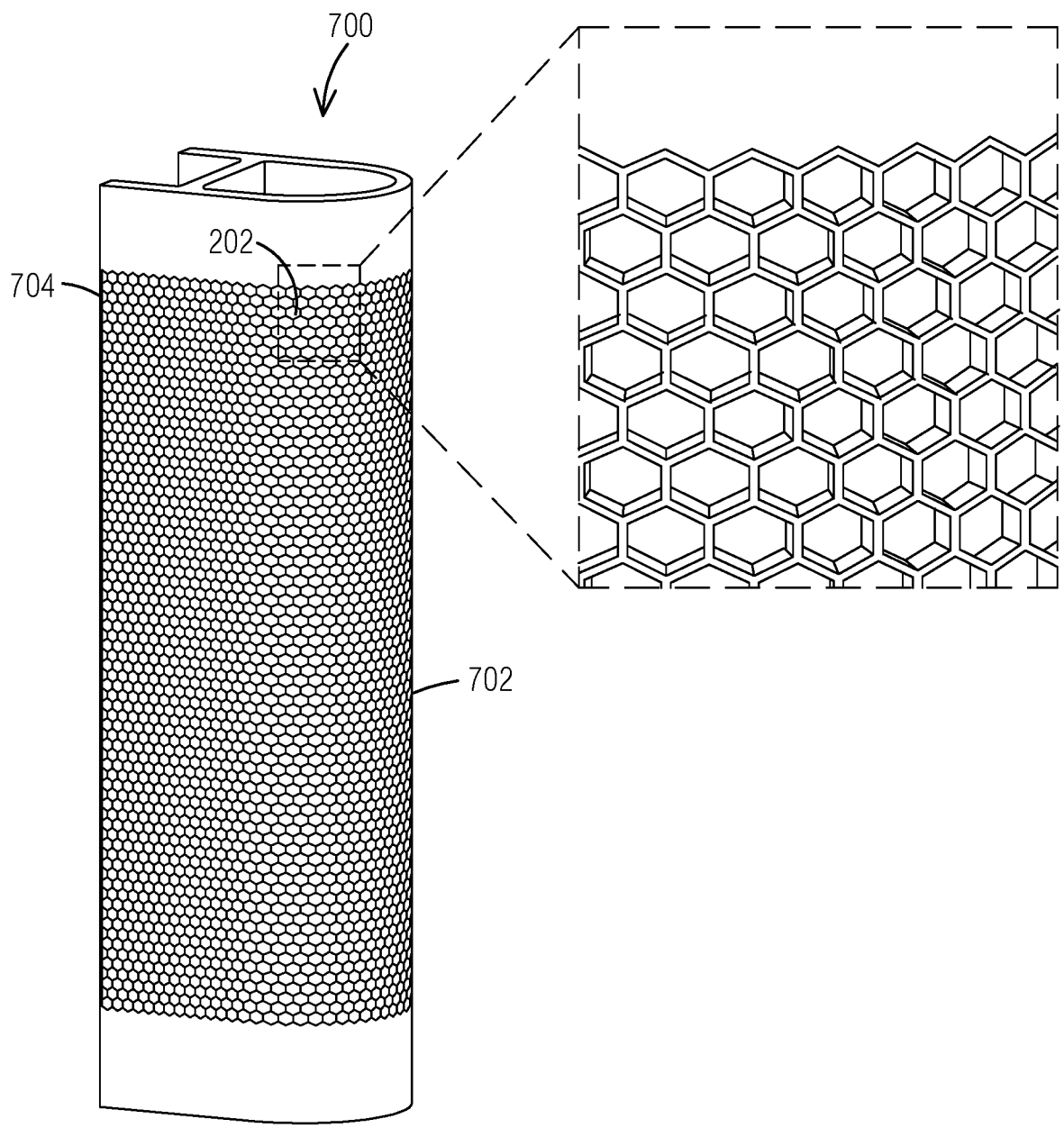
FIG. 7 illustrates a perspective view of turbine vane insert having a leading edge comprising a metallic substrate with a structured surface.

FIG. 7 illustrates a perspective view of a turbine vane insert 700. Frequently, on a turbine vane/turbine vane insert 700, the leading edge 702 experiences damage, such as from foreign object damage and results in a local TBC spallation, exposing the surface to oxidation. Severe oxidation can lead to wall loss and in a worst case, a wall breach due to exposure of the hot combustion gas, requiring repair. In an embodiment, the leading edge 702 of the turbine vane insert 700 may be repaired such that a strip 704 comprising the AM metallic substrate 202 may be attached to the existing turbine vane insert 700 replacing the damaged section. The strip 704 may be locally applied and attached by welding, for example, at the joint. In an embodiment, the metallic substrate 202 may comprise a three-dimensional repeating hexagonal arrayed pattern, shown in the exploded portion of FIG. 7, so that the pattern forms individual honeycomb cells. In a specific example embodiment, the strip 704 comprising the metallic substrate 202 may be printed by a laser powder bed fusion (LPBF) process having a 2-6 mm hexagon cell size, 1-4 mm deep, and 100-400 microns wall thickness. A thermal protection coating may then be thermally sprayed onto the strip 704. In an embodiment, the thermal protection coating may include a 150 microns bond coat 206 and a 1.25-4 mm thermal barrier coating 204 on top of the bond coat 206. The coating may then be polished to a smooth aerodynamic surface to reduce efficiency losses from high surface roughness. Utilizing this method, the strip 704 may be printed separately and applied locally.

Figure 8:
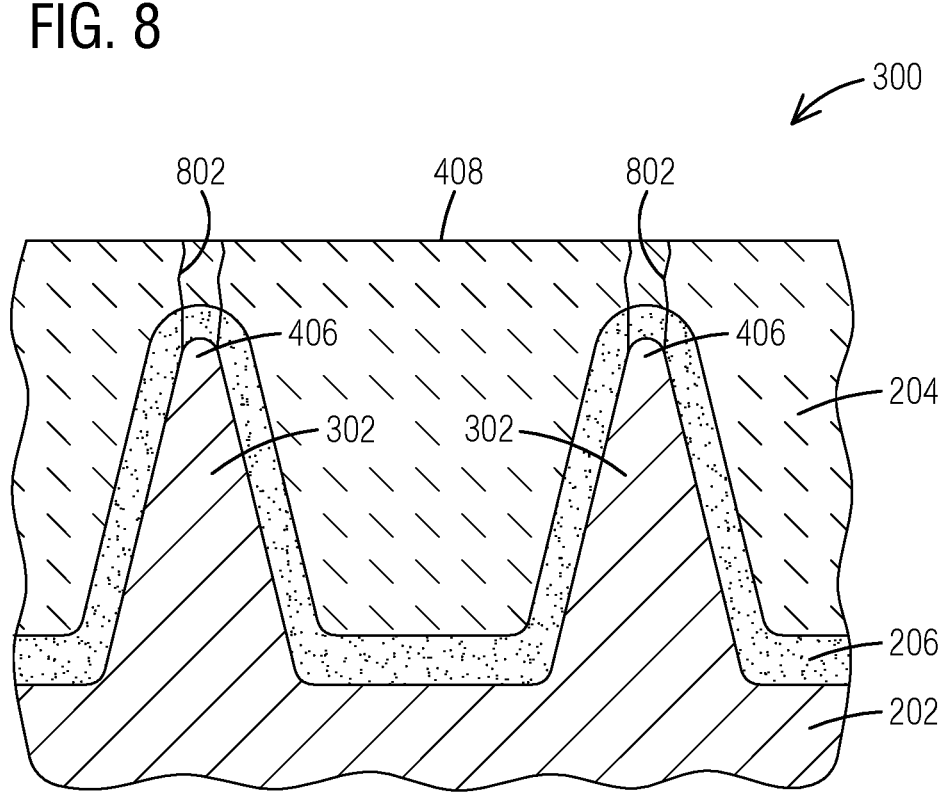
FIG. 8 illustrates a cross sectional view of a composite layer system having vertical segmentation cracking.

Vertical segmentation cracking may be introduced during the thermal spraying process when the ceramic protection coating system is sprayed onto the metallic substrate 202. FIG. 8 shows a cross sectional view of a thermal barrier coating 204 of the composite layer system 300 having vertical segmentation cracks 802. For example, the metallic substrate 202 in FIG. 8 has structured surface features 302 similar to those shown in FIG. 4. Vertical segmentation cracks 802 occur from an area of a tip 406 of each of the structured surface features 302, aligned with the tip 406 and extending through the thermal barrier coating 204 to an outer surface 408 of the composite layer system 300. These vertical segmentation cracks 802 effectively segment the TBC into the distinct TBC segments similarly to segments seen in FIG. 6.

As seen in the embodiment shown in FIG. 8, multiple vertical segmentation cracks 802 may extend from an area of a tip of the structure structured surface feature 302, aligned with the tip and extend to an outer surface 408 of the composite layer system 300. During the thermal spray process, vertical segmentation cracking may occur as a result of inherent shadowing introduced by the structured surface features 302. Inherent shadowing occurs when the coating is sprayed at a slight angle to the structured surface features. By controlling the angle to the metallic substrate, the shadowing may be tailored to result in a new unique segmentation approach of the thermal barrier coating 204.

In an alternate embodiment, vertical segmentation cracking may occur during a thermal cycling operation, i.e., during engine operation, which may subsequently occur after the thermal spraying process. A gas turbine component including the composite layer system 300 in the hot gas path i.e., the combustor section 106, and at least first two rows of blades and vanes in the turbine section 108 where the temperatures may reach 1200° C. or higher, may experience adaptive segmentation due to the exposure to hot combustion gas.

Figure 9:
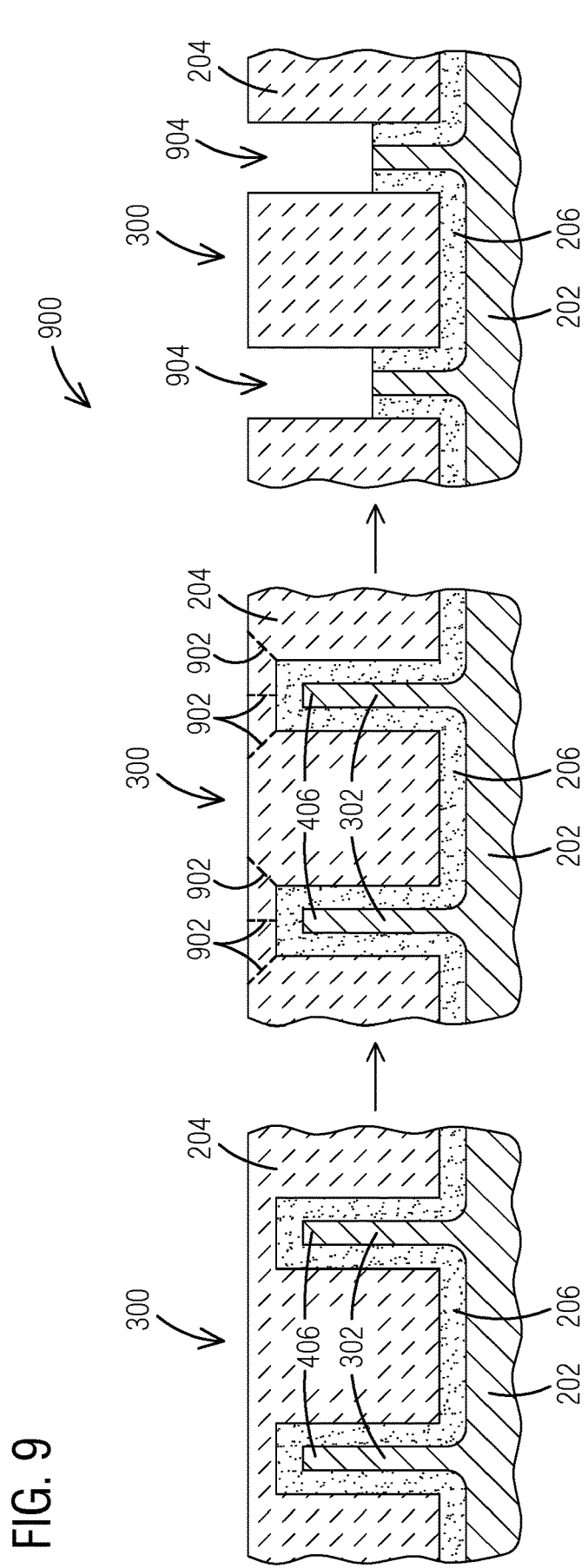
FIG. 9 illustrates a gas turbine component having the composite layer system that when exposed to a hot combustion gas shows development of vertical segmentation gaps.

FIG. 9, for example, illustrates an example of in-situ adaptive segmentation. A gas turbine component 900 having the composite layer system 300 is shown in the figure in different stages of exposure to a hot combustion gas. The component as shown on the left prior to the segmentation, includes a thermal barrier coating 204 having a thickness so that the tips 406 of the structured surface features 302 are covered by a thermal protection coating. Exposure to the hot combustion gas may cause fine vertical cracks 902 in the TBC, as shown in the middle stage, relieving the surface tensile stress. In another embodiment, thermal barrier coating spall 208 exposes the tips 406 to the hot combustion gas. Once this occurs, the metallic structured surface features 302 are exposed at the outer surface 408 as shown in FIG. 5. The tips 406 may oxide and recede into the TBC, shown in the figure at the right of FIG. 9, producing vertical segmentation gaps 904. These vertical segmentation gaps 904 as well as the vertical segmentation cracks 902 described above are beneficial by relieving the surface tensile stresses and increasing the surface temperature capability of the composite layer system 300. These vertical segmentation gaps 904 may be in a range of 50-200 microns wide. In an embodiment, when the structured surface features have a high aspect ratio, as described above, that AM enables, the thin feature size of the oxidizing rod doesn't affect the coating integrity.

Figure 10:
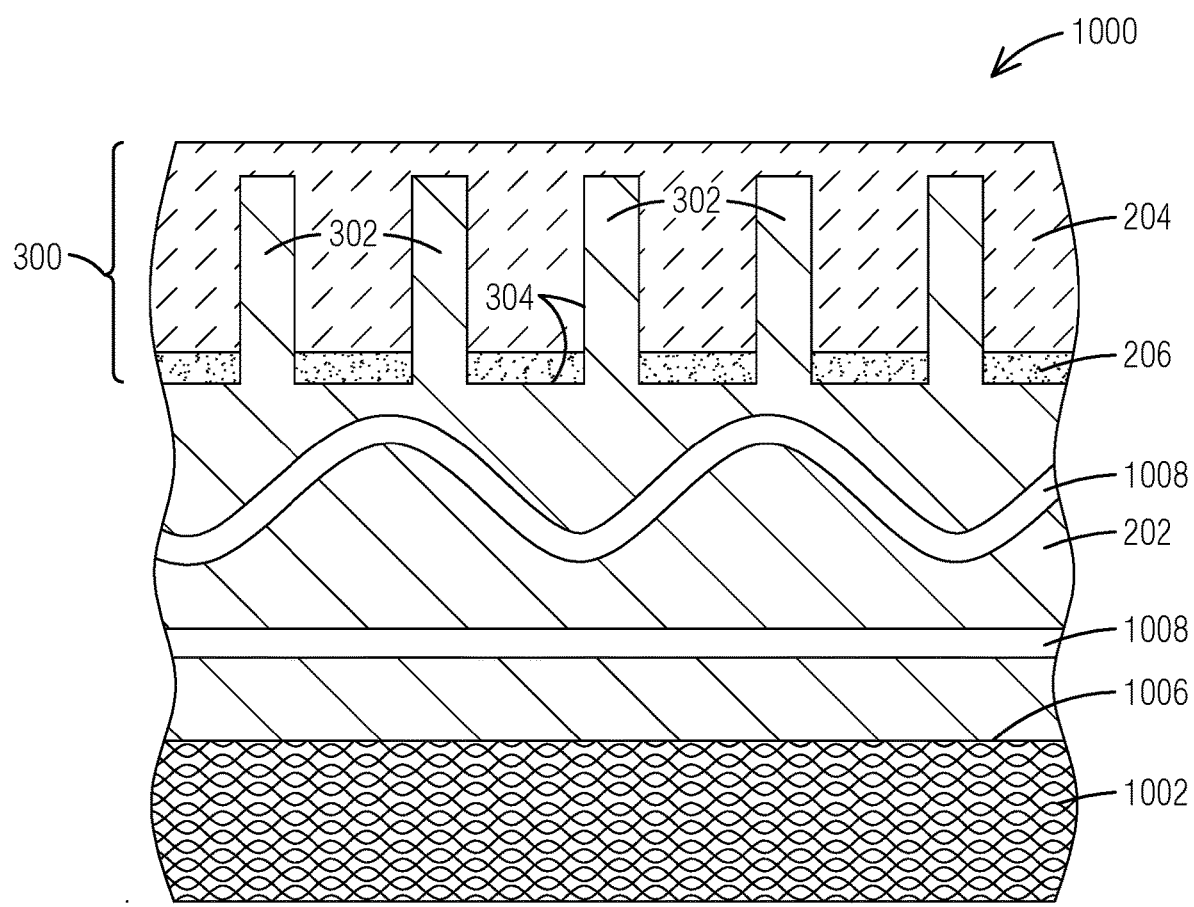
FIG. 10 illustrates a cross sectional view of a hybrid three-layer substrate-coating system.

FIG. 10 illustrates a hybrid three-layer system 1000. The hybrid three-layer system 1000 includes the composite layer system 300 as described above. Thus, the composite layer system 300 includes an additively manufactured layer comprising a metallic substrate 202. The metallic substrate 202 may include a structured surface 304 comprising structured surface features 302. A thermally sprayed thermal protection coating is coupled to the structured surface 304. In certain embodiments, including the shown embodiment of FIG. 10, the ceramic protection coating includes a bond coat 206 and a thermal barrier coating 204. The bond coat 206 may be applied directly to the structured surface 304 with the thermal barrier coating 204 applied over the bond coat 206. The thermal barrier coating 204 may comprise certain ceramic oxides such as yttria stabilized zirconia, pyrochlores and high temperature capable ceramic composites that are capable of withstanding a 1700° C. hot gas path temperature. In an embodiment, the metallic substrate 202, includes a cooling channel 1008. Additive manufacturing of the metallic substrate 202 enables the different cooling channel designs. Thus, in certain embodiments, the cooling channels 1008 may be straight or wavy, as shown.

An additively manufactured third layer comprising a lattice structure 1002 may be built together with the metallic substrate 202 to abut a second surface 1006 of the composite layer system 300. In an embodiment, the second surface 1006 is a surface opposite the structured surface 304 of the metallic substrate layer. The additively manufactured third layer may comprise a lattice structure 1002. The lattice structure 1002 provides improved structural integrity so that the third layer is more strain compliant than a typical bulk, fully solid metallic substrate. Lattice structures have a higher strain to failure in compression compared to bulk metallic solids and also have a distributed damage propagation under tensile loads. These unique damage progression behaviors allow for tailoring the lattice structure designs to meet local strain requirements. In an embodiment, the lattice structure 1002 comprises a gyroid lattice structure 1002. A gyroid lattice structure is an example of a continuous surface that is printable in a LPBF process independent of orientation. Other embodiments of the lattice structure may include a truss-based lattice structure.

In an embodiment, the hybrid three-layer system 1000 includes tunable mechanical properties so that each layer may be modified in thickness and density. By tuning, or selecting, one property such as thickness and density, another property of the layer may be optimized. For example, in an embodiment, a thickness of each layer may be modified. By modifying the thickness of the third layer, for example, the load carrying capability of the hybrid three-layer system 1000 may be tailored for local strain levels. By modifying the thickness of the metallic substrate layer 202, the in-wall cooling effectiveness may be modified. By modifying the height of the structured surface feature 302, and the overall thermal protection coating thickness 402, the overall thermal resistance of the hybrid three-layer system 1000 may be modified. In another embodiment, the metallic substrate layer 202 and the lattice layer 1002, which may be additively manufactured, may include depth varying material properties including, for example, density. Additionally, the shape of the lattice structure 1002 may be varied. Exemplary ways to modify mechanical properties include application of a plurality of layers, enabled by additive manufacturing, that vary slightly in composition. In this way, the hybrid three-layer system 1000 may be adapted to the varying temperatures, strain, and pressure loads placed upon the it locally for any specific component design.

Figure 11:
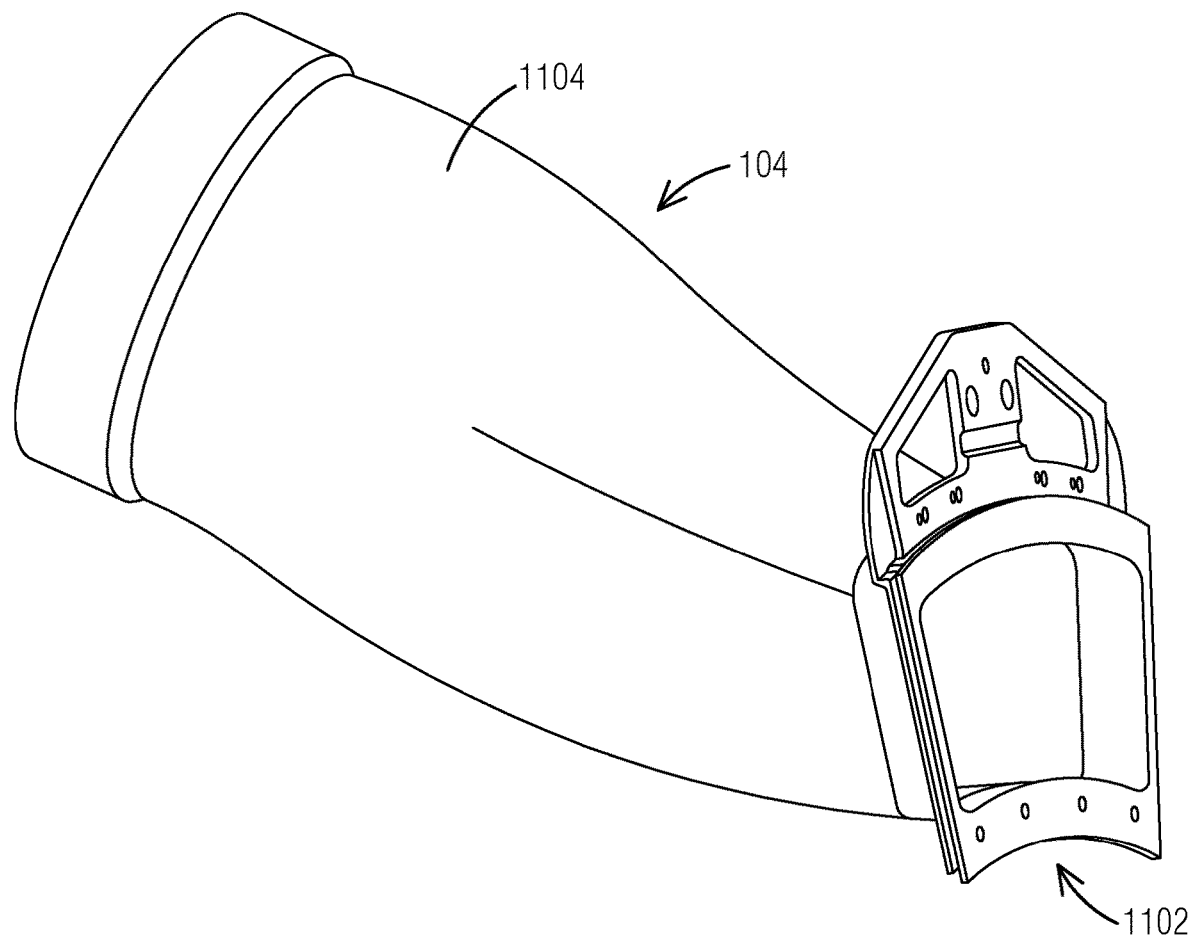
FIG. 11 illustrates a perspective view of a transition component.

FIG. 11 illustrates a transition 104 which is located in the combustor section 106 of the gas turbine engine 100 to convey the combustion gases from the combustor section 106 to the turbine section 108. The transition 104 includes a cylindrical main body 1104 followed in the gas path by an exit mouth 1102 where the transition 104 is secured to the stage one turbine vane structure. As the combustion gas passes through the combustor 124, it changes direction due to a bend in the transition 104. This change in direction along with passage into a differently shaped exit mouth 1102 (from circular to rectangular) forces the combustion gas against an internal surface 1202 (see FIG. 12) of the exit mouth 1102 thus exposing the internal surface 1202 to extremely hot temperatures such as up to 1700° C.

Typically, the transition exit mouth 1102 is machined out of a superalloy plate, subtractively, resulting in a significant waste of materials. This exit mouth 1102 is then welded to the main body 1104 of the transition 104 and to a bracket for mounting to an inner casing of the gas turbine engine 100.

Figure 12:
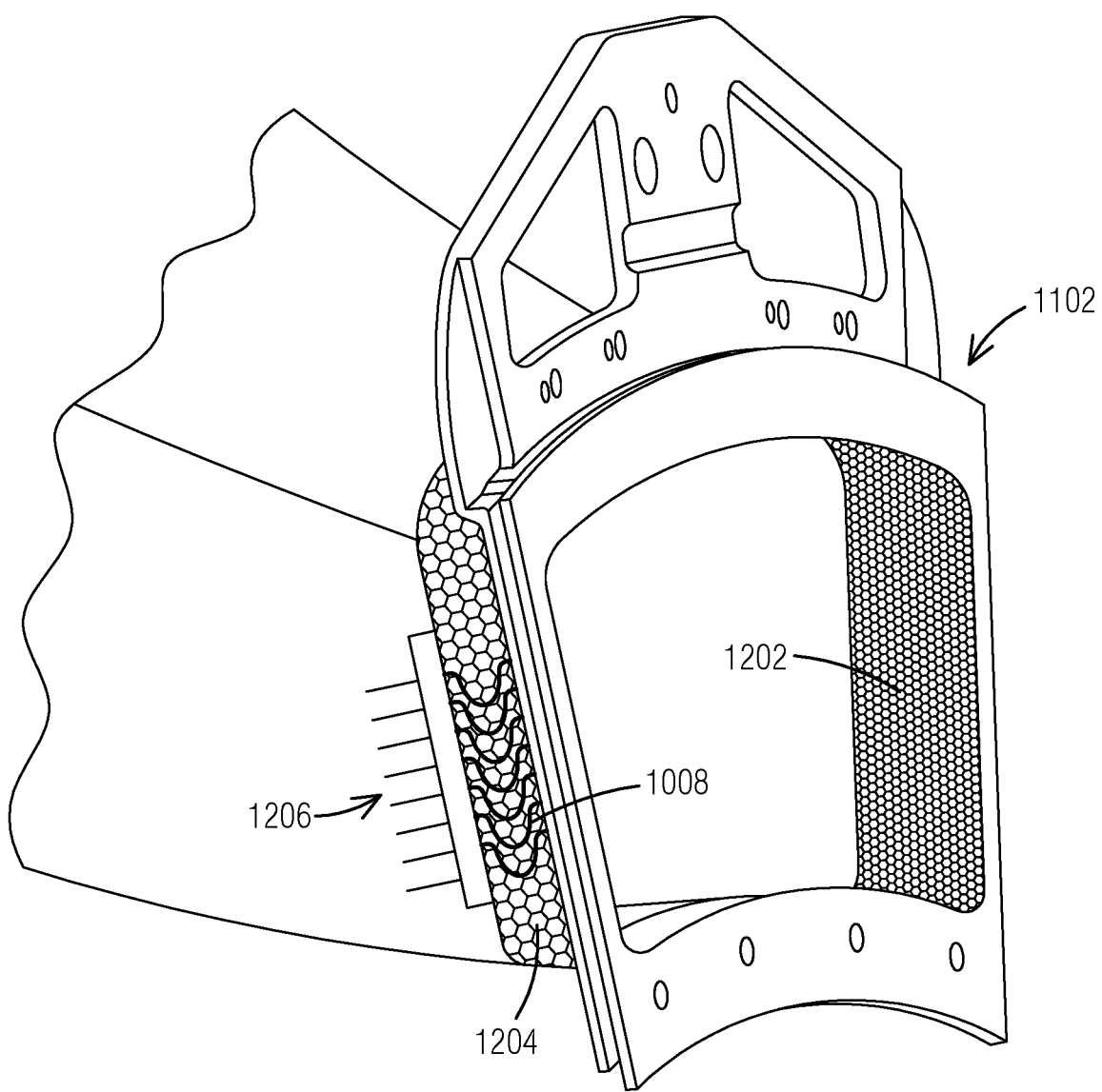
FIG. 12 illustrates a perspective view of a transition component including the hybrid three-layer substrate-coating system.

The inventors thus propose an advanced additively manufactured exit mouth 1102 design comprising the hybrid three-layer system 1000 as seen in FIG. 12. The exit mouth 1102 comprising the hybrid three-layer system 1000 may then be joined to a conventionally manufactured bonded panel transition main body 1104. The internal surface 1202 of the exit mouth 1102 includes the thermal protection coating of the hybrid three-layer system 1000 whose thermal barrier coating 204 may be capable of handling temperatures up to 1700° C. The external surface 1204 of the exit mouth 1102, exposed to the combustor shell air in the gas turbine engine 100, comprises the lattice structure 1002 for strain compliance.

The metallic substrate 202, positioned in between the thermal protection coating and the lattice structure 1002, may include cooling channels 1008 for carrying cooling air. FIG. 12 shows wavy cooling channels 1008 through the lattice structure 1002. Additive manufacturing enables a wavy cooling channel 1008 structure that may increase the heat transfer capability of the cooling channel by increasing the turbulence of the cooling flow. The wavy cooling channels 1008 may mate up to straight cooling channels 1206 in the main body 1104 when the exit mouth 1102 is joined to the main body 1104. As described above, the metallic substrate 202 may include structured surface features 302. In an embodiment, the structured surface features 302 are approximately 3 mm in height enabling a thicker TBC, such as between 3-4 mm, and exposure to higher temperatures of 1500-1800° C., for example. A joining process, such as welding, that maintains high structural integrity between the AM exit mouth and the bonded pant transition main body 1104 may then be utilized to attach the two components.

Figure 13:
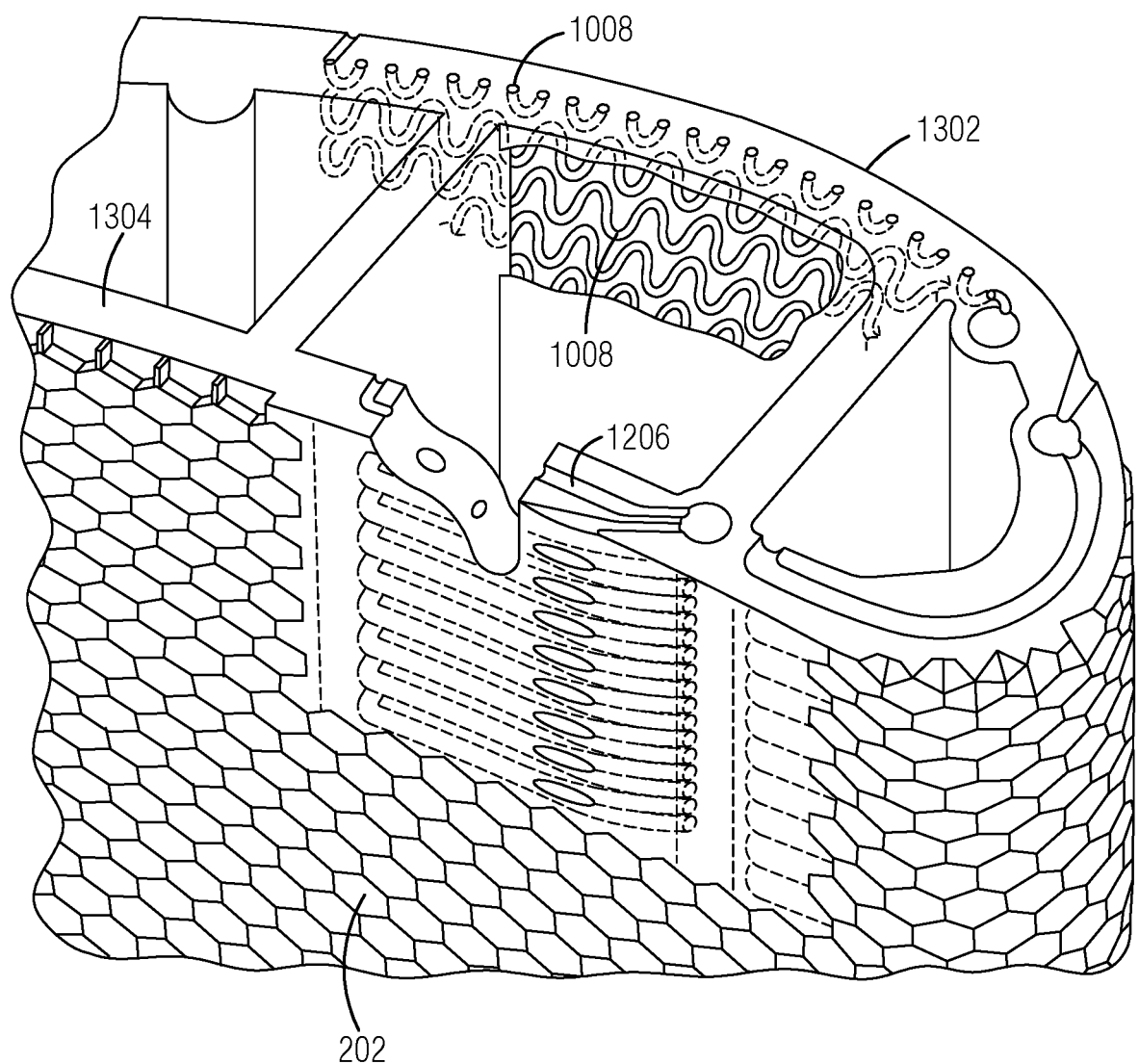
FIG. 13 illustrates a first cross sectional perspective view of a portion of a vane airfoil.

In order to mitigate the effects of the hot combustion gas exposure to turbine vanes, currently different cooling schemes are utilized including impingement cooling, using vane inserts with internal ribs, and connecting the suction and pressure sides for structural integrity. The inventors thus propose using the composite layer system 300 with in-wall and transpiration cooling to cool the turbine vane 118. FIG. 13 illustrates an airfoil portion 1300 of a turbine vane 118. The airfoil portion 1300 comprises the composite layer system 300 with the thermal barrier coating 204 (not shown) on the exterior of the vane airfoil so that it is exposed to the hot combustion gas of the flow path.

In the illustrated embodiment of FIG. 13, the metallic substrate 202 of the airfoil portion 1300 includes straight cooling channels 1206 on the pressure side 1304 and wavy cooling channels 1008 on the suction side 1302. Having wavy cooling channels 1008 increases the cooling capability of the channels by creating a more turbulent fluid flow, i.e., as the cooling air bends through the cooling channels 1008 it comes into contact with the cooling channel wall and absorbs more heat than in a straight cooling channel 1206.

In an embodiment of the proposed turbine airfoil, the structured surface features 302 include a height of between 1 and 3 mm enabling a thick, between 3-4 mm, thermal barrier coating 204 capable of high temperatures of approximately 1700-1800° C. As shown in FIG. 13, the structured surface features 302 may comprise a three-dimensional hexagonal arrayed (honeycomb) pattern. The thermal barrier coating 204 may be thermally sprayed on to the metallic substrate 202 to cover the structured surface features 302. As stated above, thermal protection coating materials such as ceramic oxides and pyrochlores enable exposure to the high temperatures, minimizing damage to the underlying metallic substrate 202.

Figure 14:
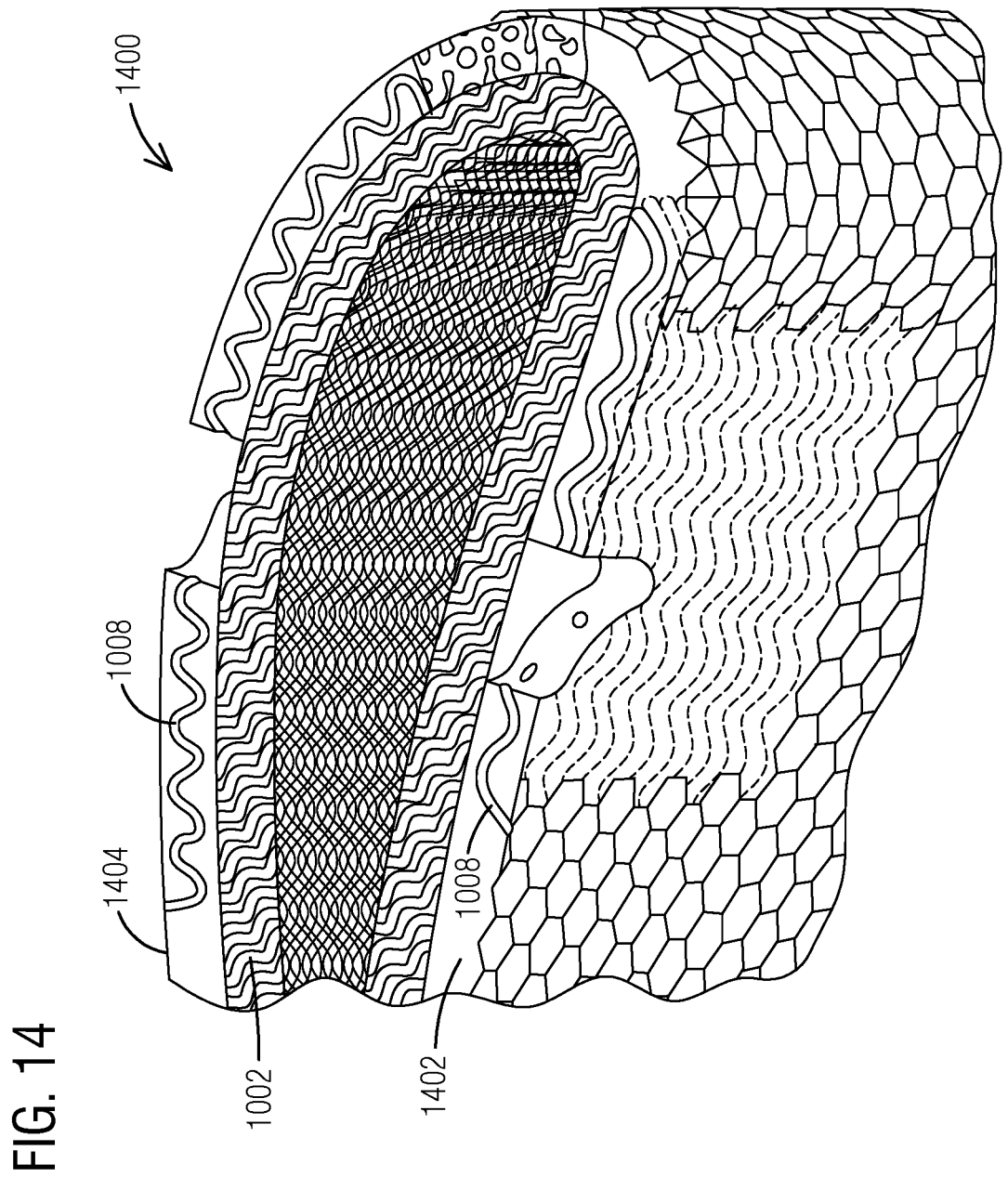
FIG. 14 illustrates a second cross sectional perspective view of a portion of a vane airfoil.

In an embodiment, as shown in FIG. 14, the airfoil portion 1400 of a turbine vane may comprise the hybrid three-layer system 1000 having the lattice structure 1002 on the interior of the vane airfoil 1400. The shown embodiment also shows low amplitude wavy cooling channels 1008 on the pressure side 1402 of the hybrid three-layer vane airfoil 1400 and high amplitude wavy cooling channels 1008 on the suction side 1404. The wavelength utilized for the cooling channels 1008 relates to the pressure drop across the wall between the internal cavity pressure and the external hot gas path pressure. For the hybrid three-layer vane airfoil 1400, the lattice structure 1002 lies on the interior of the component so that it may provide an approach to minimize the strain/stress loading. Lattice structures are more compliant (strain tolerant) than bulk metallic structures in compression and have a supple failure mode in tension. This mechanical compliance may also be tailored, by the choice of the unit cell dimensions, to the local stress/strain conditions.

FIG. 15 illustrates a conventional edge portion 1502 of a gas turbine component as compared with an edge portion 1500 that includes the composite layer system 300. Each edge portion 1500, 1502 includes two walls 1504 that intersect at an edge 1506. A conventional transition exit mouth wall thickness profile ($t_1$) is illustrated on the left side of the FIG. 15. The thickness ($t_1$) of the conventional edge portion 1502 may be in a range of 4 to 5 mm. In an embodiment, the edge portion may be a side wall of the exit mouth 1102 of a transition 104. In a gas turbine engine 100, typically, there exists an annular arrangement of transition components 104 with adjacent transitions 104 separated by a side seal preventing ingestion of hot gas from the vane entrance back into the combustor shell. The TBC for the conventional exit mouth is thin and may be, for example, in a range of 0.1 to 0.2 mm while the conventional edge portion 1502 has a relatively thick edge due to a conventional manufacturing process. The exit mouth side wall thickness may include a cooling channel in the metallic substrate to deliver a cooling air flow to the tip of the side wall.

In an embodiment, the inventors propose an edge portion 1500 having a thinner transition exit mouth wall. In contrast to the conventional side wall thickness ($t_1$), an AM exit mouth side wall comprising the composite layer system 300, shown on the right side of FIG. 15, may have an edge portion 1500 thickness ($t_2$) in a range of 1 to 3 mm due to the structured surface features 302 and a higher thermal resistance due to higher ceramic TBC content in the wall. Thus, the composite layer system of the exit mouth side wall enables a thinner side wall geometry. The TBC for this arrangement may be approximately 0.5 mm. The thinner geometry of the edge portion 1500 may reduce the aerodynamic wake the hot gas flow from the transition 104 into the turbine. This can result in an increase in stage efficiency over a gas turbine utilizing the conventional transition exit mouth side wall thickness ($t_1$). In addition, due to the higher thermal resistance of the composite side seal, the local substrate temperatures may be lowered for the same cooling channel design.

In an alternate embodiment, the edge portion 1500 is a trailing edge of a turbine vane 118. The metallic substrate 202 may include structured surface features 302 in a range, for example, of 0.5 mm-1 mm, shorter than those in the pressure and suctions sides of the vane airfoil. The trailing edge may be tapered to a unique composite architecture. In order to maintain a thin geometry, for example, the composite layer system may include a total thickness of approximately 0.5-1 mm which may minimize aerodynamic impact on turbine efficiency. Due to the higher thermal resistance of the composite trailing edge, the local substrate temperatures can be lowered. While a couple of embodiments of the edge portion have been discussed in the disclosure, other embodiments of a composite component edge portion may also be possible wherein the increased effective TBC thickness of a composite layer system may result in different cooling channel designs resulting from topology optimization.

Cooling components in increasingly high temperatures in a gas turbine engine has proven to be challenging. Thermal barrier coatings (TBCs) are commonly used, however, they are prone to cracking which then may cause spallations of the coating. The proposed composite layer system including structured surface features projecting from the metallic substrate into the TBC provides a significant increase in reliability over conventional TBC coated metallic substrates without structured surface features, especially upon local TBC spallation.

Additive manufacturing enables the manufacturing of components that were difficult to manufacture using conventional manufacturing techniques. In many of the additive manufacturing processes, the components are manufactured layer by layer. With additive manufacturing, the available design space is significantly larger allowing for unique in-wall cooling channel designs, strain compliant lattice structures and high temperature capable protection systems. The hybrid three-layer system, where two of the three layers may be additively manufactured may also be tunable in thickness and density due to the large design space enabled by additive manufacturing, thus adapting to the varying temperature, strain, and pressure loads of all cooled gas turbine components.

For large gas turbines, size limitations of Laser Powder Bed Fusion (LPBF) machines can be a hurdle in realizing the full AM benefit, however. In these situations, integration of hybrid manufacturing process such as AM and joining, will maximize the AM benefit. For example, a transition, as proposed, having an AM transition exit mouth including the hybrid three-layer system, may be joined to a conventionally manufactured bonded panel transition main body.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A hybrid three-layer system, comprising:
    a two-layer composite layer system, comprising:
        a structured surface additively manufactured onto a metallic substrate and including structured surface features formed to project above the metallic substrate, each of the structured surface features separated from adjacent structured surface features by grooves, and
        a thermal protection coating thermally sprayed onto the structured surface and bonded to each of the structured surface features; and
    an additively manufactured third layer comprising a lattice structure in contact with a surface of the metallic substrate of the composite layer system
    wherein the hybrid three-layer system is at least a portion of a gas turbine component exposed to a hot combustion gas;
    wherein the gas turbine component comprises an airfoil;
    wherein the metallic substrate includes a plurality of wavy cooling channels for the passage of a cooling air;
    wherein a pressure side of the airfoil includes a first plurality of wavy cooling channels and a suction side of the airfoil includes a second plurality of wavy cooling channels, and wherein the first plurality of wavy channels include a higher amplitude than the second plurality of wavy channels.

2. The hybrid three-layer system of claim 1, wherein a height of each structured surface feature is in a range of 1 mm to 4 mm.

3. The hybrid three-layer system of claim 2, wherein a height of each structured surface feature is 3 mm.

4. The hybrid three-layer system of claim 1, wherein the lattice structure is a gyroid surface-based lattice structure.

5. The hybrid three-layer system of claim 1, wherein the lattice structure is a truss-based lattice structure.

6. The hybrid three-layer system of claim 1, wherein the thermal protection coating includes a bond coat applied to the structured surface and a ceramic thermal barrier coating applied over the bond coat.

7. The hybrid three-layer system of claim 1, wherein the third layer comprises an internal surface of the airfoil and the thermal protection coating comprises an external surface of the airfoil.

8. The hybrid three-layer system of claim 1, wherein the pressure side of the airfoil further includes a plurality of straight cooling channels.

9. The hybrid three-layer system of claim 1, wherein a height of each of the structured surface features is between 1 mm-3 mm.

10. The hybrid three-layer system of claim 1, wherein the gas turbine component comprises a transition exit mouth of a gas turbine engine.

11. The hybrid three-layer system of claim 10, wherein the thermal protection coating comprises an internal surface of the transition exit mouth exposed to the combustion hot gas flow of a combustor of the gas turbine engine.

12. The hybrid three-layer system of claim 11, wherein the third layer comprises an external surface of the transition exit mouth exposed to a combustor shell air of the combustor of the gas turbine engine.

13. The hybrid three-layer system of claim 1, wherein the thermal protection coating includes a ceramic thermal barrier coating (TBC) layer and a bond coat (BC) layer, the bond coat layer coupled to the metallic substrate.

* * * * *